US012774796B2

(12) United States Patent
Akin et al.

(10) Patent No.: US 12,774,796 B2
(45) Date of Patent: Oct. 27, 2026

(54) LIGHTING DEVICE FOR VEHICLES, AND CONTROL METHOD

(71) Applicant: Hella GmbH & Co. KGaA, Lippstadt (DE)

(72) Inventors: Hamza Akin, Lippstadt (DE); Andreas Lintz, Lippstadt (DE); Maximilian Mevenkamp, Hamm (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 19/079,091

(22) Filed: Mar. 13, 2025

(65) Prior Publication Data

US 2025/0207751 A1 Jun. 26, 2025

Related U.S. Application Data

(63) Continuation of application No. PCT/EP2023/074865, filed on Sep. 11, 2023.

(30) Foreign Application Priority Data

Sep. 19, 2022 (DE) .................... 10 2022 123 952.7

(51) Int. Cl.
*F21S 41/663* (2018.01)
*F21S 41/25* (2018.01)
*F21S 45/60* (2018.01)

(52) U.S. Cl.
CPC ............ *F21S 41/663* (2018.01); *F21S 41/25* (2018.01); *F21S 45/60* (2018.01)

(58) Field of Classification Search
CPC ...... H05K 5/0212; F21S 45/60; F21S 41/663; F21S 41/25
See application file for complete search history.

(56) References Cited

U.S. PATENT DOCUMENTS 8,459,848 B2 * 6/2013 Marley .................. F21S 45/60 362/520
10,065,476 B2 * 9/2018 Bonneau ................ F21S 45/60
11,585,513 B2 * 2/2023 Rivas .................... F21S 41/192
12,022,635 B2 * 6/2024 Dunn ............... G02F 1/133385
2013/0208496 A1 8/2013 Kishimoto

FOREIGN PATENT DOCUMENTS

DE 102005019651 A1 11/2006
DE 102008008664 A1 9/2009
DE 202012103902 U1 11/2012

(Continued)

*Primary Examiner* — Matthew J. Peerce
(74) *Attorney, Agent, or Firm* — Husch Blackwell LLP

(57) ABSTRACT

A lighting device for vehicles is provided with a housing with a lens that covers an opening in the housing. A light source unit is positioned inside the housing, and contains a plurality of light sources for generating a predefined light distribution. A control unit of the light source unit generates a control signal with which the light source unit can be controlled. The control signal switches off the light source unit with a switch-off protocol. Sections of the light sources in the light source unit are successively switched off and/or dimmed within an anti-condensation period ($t_A$), such that no condensation accumulates on the inner surface of the lens.

12 Claims, 3 Drawing Sheets

(56) References Cited

FOREIGN PATENT DOCUMENTS

| | | | |
|---|---|---|---|
| DE | 102017119795 | A1 | 2/2019 |
| DE | 102019108312 | A1 | 10/2020 |
| EP | 2014972 | B1 | 6/2014 |
| EP | 3822536 | A1 | 5/2021 |
| EP | 3954938 | A1 | 2/2022 |

* cited by examiner

LIGHTING DEVICE FOR VEHICLES, AND CONTROL METHOD

CROSS REFERENCE

This application claims priority to PCT Application No. PCT/EP2023/074865, filed Sep. 11, 2023, which itself claims priority to German Application No. 10 2022 123952.7, filed Sep. 19, 2022, the entireties of both of which are hereby incorporated by reference.

FIELD OF THE INVENTION

The invention relates to a lighting device for vehicles that has a housing with a lens that covers an opening in the housing, a light source unit that contains numerous light sources inside the housing for generating a predefined light distribution, and a control unit for generating a control signal with which the light source unit can be controlled.

The invention also relates to a control method for a light source unit in the lighting device.

BACKGROUND OF THE INVENTION

EP 2 014 972 B1 discloses a Peltier device for preventing undesired condensation on optical components in a lighting device for vehicles. This keeps the temperature inside the housing above the dew point for the optical component.

An infrared lamp is integrated in the housing for a lighting device for vehicles in EP 3 822 536 A1, which keeps the temperature inside the housing at a level that prevents condensation.

DE 10 2019 108 312 A1 discloses a lighting device for vehicles in which the light sources are switched on and off sequentially to generate a wiping lighting effect. This lighting effect generates a signal light function.

BRIEF SUMMARY OF THE INVENTION

The object of the present invention is to therefore create a lighting device and a method for controlling a light source unit with which undesired condensation on the inner surface of an optical component in the lighting device can be prevented in a simple manner.

To solve this problem, in an example embodiment, the control signal is designed to switch off the light source unit with a switch-off protocol, according to which at least some of the light sources in the light source unit are switched off and/or dimmed successively during an anti-condensation period, such that no condensation accumulates on the inner surface of a lens.

According to the invention, light sources in the light source unit are switched off gradually, according to a switch-off protocol, such that no condensation accumulates on the inner surface of a lens. This advantageously does not require any additional components. Undesired condensation is simply prevented by gradually switching off the light source unit. The fundamental concept of the invention is to intelligently reduce the brightness of the light source unit, or light sources therein, during an anti-condensation period (switch-off period) smoothly or in increments, such that condensation does not accumulate on the inner surface of the lens.

According to a preferred embodiment of the invention, the anti-condensation period and/or decrease in the brightness of the light source unit is such that the air temperature inside the housing remains higher than the condensation temperature during the anti-condensation period.

According to another aspect of the invention, the brightness of the light source unit decreases gradually, such that the temperature on the inner surface of the lens is at least 2 K, preferably 5 K, higher than the dew point temperature for the air therein. This results in a safety buffer, such that in the event of an abrupt change in the environmental conditions, condensation accumulation on the lens is reliably prevented.

According to another aspect of the invention, the light source unit contains numerous light sources arranged in a matrix, such that sequential deactivation of the individual light sources results in a basically linear reduction in the brightness of the light source unit. If this linear reduction takes place over at least two hours (minimum switch-off period), condensation accumulation on the lens is reliably prevented.

In an alternative design, a decrease in the brightness of the light source unit can also be obtained by dimming at least some of the light sources. This advantageously results in a simple means of obtaining a desired switch-off curve for the brightness of the light source unit.

According to another aspect of the invention, the decrease in brightness can follow a parabolic curve instead of a linear course, thus shortening the necessary anti-condensation period. Because the brightness of the light source unit does not decrease as radically at the start of the switch-off process, the temperature inside the housing can be kept relatively high initially. This prevents a decrease in the interior temperature to below a specific temperature after completion of the switch-off process.

The method obtained with the invention is characterized in that at least some of the light sources in the light source unit are switched off and/or dimmed successively, such that the brightness of the light source unit decreases continuously during the switch-off process, until reaching a total blackout at the end of the process.

The particular advantage of the invention is that the temperature inside the housing can be kept high enough to prevent condensation on the lens by switching off the light source unit gradually. This advantageously requires a switch-off process for the light source unit that is based only on empirical data. Additional components are not needed.

In a preferred embodiment of the invention, the brightness of the light source unit is decreased linearly during a minimal anti-condensation period. This minimal anti-condensation period is preferably 2 hours, in order to prevent a radical temperature decrease that would result in falling below the dew point temperature. Undesired condensation can be advantageously prevented during a linear reduction in brightness.

In an alternative design, the decrease in the brightness of the light source unit follows a parabolic curve. Compared with a linear reduction of the brightness, the decrease in the temperature on the inside is not as great initially, thus shortening the necessary anti-condensation period.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
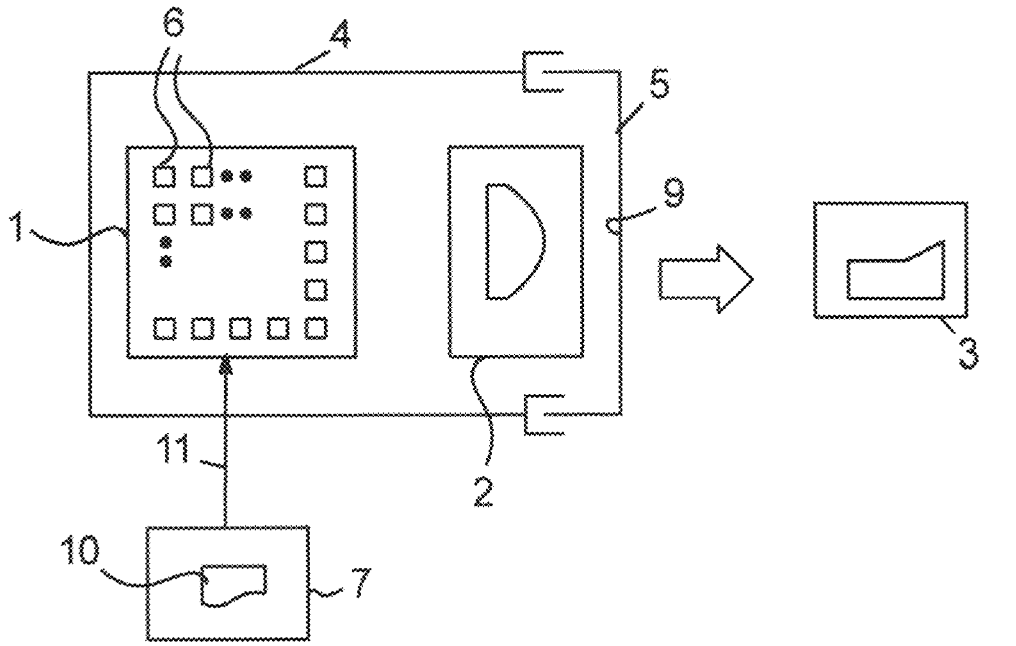
FIG. 1 shows a block diagram of the lighting device obtained with the invention.

A lighting device for vehicles contains a light source unit 1 with a dedicated optical unit 2 that contains a lens for generating a predefined light distribution, e.g. a low beam light distribution 3. The light source unit 1 and optical unit 2 are in a housing 4 for the lighting device. An opening in the housing 4 is covered by a transparent lens 5.

The light source unit 1 contains numerous light sources arranged in a matrix, preferably LEDs 6.

The light source unit 1 has a dedicated control unit 7 with which the individual light sources 6 can be switched on and off, or dimmed.

The lighting device is a high-resolution headlamp containing numerous light sources 6 in an n×m matrix. A first part of the light sources 6 has a first primary lens (not shown). A second part of the light sources 6 has a second primary lens (not shown). When the first part of the light sources 6 is switched on, the lenses in the optical unit 2 generate the low beam light distribution 3, and when the second part of the light sources 6 are also switched on, a high beam light distribution is generated (not shown).

To prevent undesired condensation on the inner surface 9 of the lens 5, the control unit 7 has a program 10 with which a control signal 11 is generated that switches off the light sources 6 in a controlled manner, e.g. from an "on" state that generates the low beam light distribution 3. The control unit 7 can contain a microprocessor, for example, which has a memory in which the program 10 is stored. The program 10 could also be a hard-wired program in a microcontroller.

Figure 2:
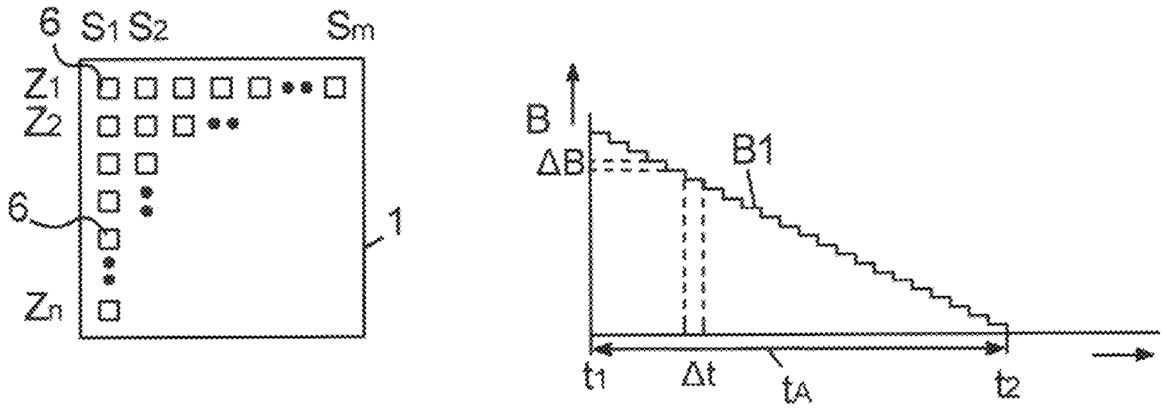
FIG. 2 shows a light source unit that contains numerous light sources that can be switched off successively, and the associated decrease in the brightness of the light source unit.

According to a first embodiment of the invention shown in FIG. 2, the light sources 6 that are switched on for the low beam light distribution 3, which are arranged in n rows $Z_1$, $Z_2$, . . . . $Z_n$ and m columns $S_1$, $S_2$, . . . . $S_m$, are switched off sequentially, either in rows or columns, such that the brightness B of the light source unit 1 decreases in increments, starting at an initial time $t_1$ for a switch-off period $t_A$ and ending at a final time $t_2$ of this switch-off period $t_A$. At every interval Δt, the brightness decreases by the difference ΔB of the brightness of a single light source 6. This results in an incremental decrease in brightness B1, which is nearly linear. The switch-off period $t_A$ forms an anti-condensation period that ensures that no condensation is formed on the inner surface 9 of the lens 5.

Figure 5:
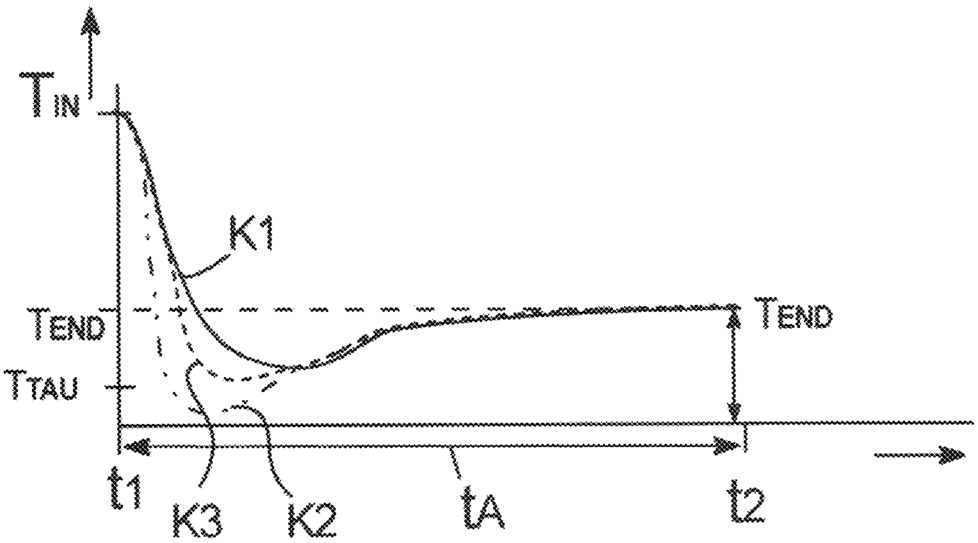
FIG. 5 shows the temperature curve inside the housing for a linear decrease in the brightness shown in FIGS. 2 and 3, with different switch-off periods (anti-condensation periods).

The curve of an internal housing temperature $T_{IN}$ is shown in FIG. 5 as a function of the duration of the switch-off process during the switch-off period $t_A$. In this exemplary embodiment, the switch-off period $t_A$ lasts for three hours, such that the temperature curve K1 shown in FIG. 5 is obtained. The temperature $T_{IN}$ drops abruptly after starting the switch-off process at the time $t_1$. It never reaches the temperature $T_{TAU}$ at which condensation would occur. Instead, the curve K1 flattens out at a temperature difference Δt which is 5 K above the condensation temperature $T_{TAU}$, where it then levels off. If the light source unit 1 were to be switched off abruptly by switching off all of the light sources 6 simultaneously, the curve K2 would be obtained, which levels off at the same end value $T_{END}$, but it would first fall below the condensation temperature $T_{TAU}$, resulting in condensation on the lens 5.

A shorter switch-off period $t_A$ results in a higher condensation temperature $T_{TAU}$, or a lower end temperature $T_{END}$. With a switch-off period $t_A$ of two hours, the curve K3 is obtained, which also does not result in a temperature falling below the condensation temperature $T_{TAU}$.

Figure 3:
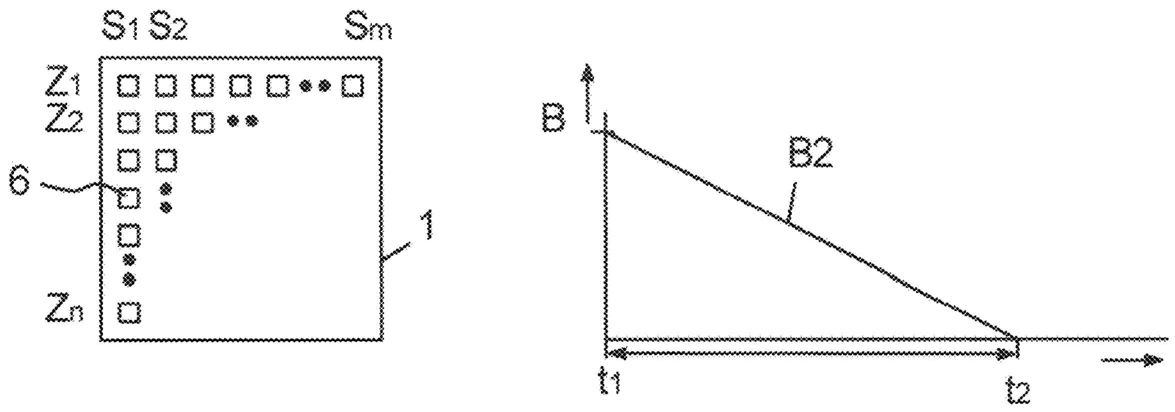
FIG. 3 shows the light source unit with numerous light sources dimmed simultaneously, and an associated decrease in the brightness of the light source unit.

In an alternative embodiment, shown in FIG. 3, at least some of the light sources 6 in the light source unit 1 are also dimmed to a lower brightness B, such that brightness B of the light source unit 1 decreases or diminishes linearly. Instead of an incremental curve, a linear decrease B2 in the brightness B is obtained. If the switch-off period $t_A$ lasts at least 2 hours, it is ensured that the temperature difference curve K3 remains above the condensation temperature $T_{TAU}$.

Figure 4:
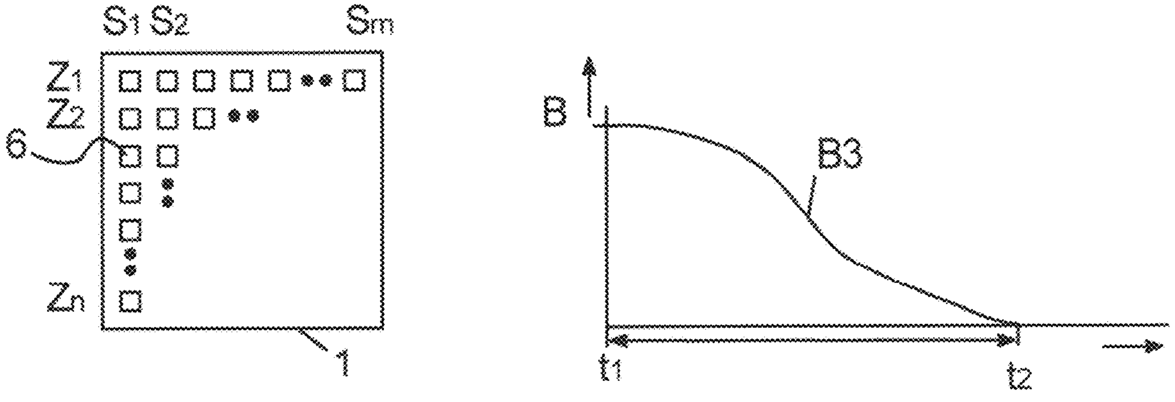
FIG. 4 shows the light source unit with numerous light sources dimmed simultaneously, and a decrease in the brightness following a parabolic curve shown in the graph.

In another embodiment of the invention, shown in FIG. 4, the light sources 6 in the light source unit 1 can also be switched off successively and/or simultaneously dimmed to a lower brightness B, such that the decrease in brightness B3 follows a parabolic curve between the starting time $t_1$ of the switch-off period $t_A$ and the end time $t_2$. This prevents the temperature from dropping below that in FIG. 5, making it possible to shorten the overall switch-off period $t_A$.

LIST OF REFERENCE SYMBOLS

1 light source unit
2 optical unit
3 low beam light distribution
4 housing
5 lens
6 light source
7 control unit
8 printed circuit board
9 inner surface
10 switch-off program/switch-off protocol
11 control signal
B brightness
B1 brightness decrease
B2 linear decrease
B3 brightness
K1, K2, K3 temperature curve
$T_{A1}$ starting time
$t_A$ switch-off period
$T_{A2}$ end time
$\Delta_{tmin}$, Δt temperature difference
ΔB difference
$T_{TAU}$ condensation temperature
$T_{IN}$ internal housing temperature
$T_{END}$ end value
$T_S$ temperature
$Z_1$, $Z_2$, . . . . $Z_n$ n rows
$S_1$, $S_2$, . . . . $S_m$ m columns

The invention claimed is:

1. A lighting device for vehicles, the lighting device comprising:

a housing with an opening;

a lens that covers the opening in the housing;

a light source unit inside the housing, the light source unit comprising:

a plurality of light sources arranged in a matrix for generating a predefined light distribution, the plurality of light sources comprising a first set of light sources and a second set of light sources, wherein the first set of light sources is configured to generate a low beam light distribution, wherein the first set of light sources and the second set of light sources are configured to cooperatively generate a high beam light distribution, and a control unit configured for generating a control signal for controlling the light source unit, wherein the control signal causes the first set of light sources of the plurality of light sources in the light source unit to be successively switched off and/or dimmed over the course of an anti-condensation period ($t_A$) of at least two hours, wherein during the anti-condensation period (tA), no condensation accumulates on an inner surface of the lens, wherein the first set of light sources is controlled at a start ($t_1$) of the anti-condensation period ($t_A$) to generate the low beam light distribution.

2. The lighting device according to claim 1, wherein the control signal causes the first set of light sources to be switched off and/or dimmed successively during the anti-condensation period, during which a temperature ($T_{IN}$) inside the housing remains higher than a condensation temperature ($T_{TAU}$).

3. The lighting device according to claim 1, wherein the control signal causes a temperature ($T_{IN}$) on the inner surface of the lens to be higher than a condensation temperature ($T_{TAU}$) by at least 2 Kelvin.

4. The lighting device according to claim 1, wherein the control signal causes the plurality of light sources in the light source unit to be switched off successively.

5. The lighting device according to claim 1, wherein the control signal causes at least some of the plurality of light sources to dim during the anti-condensation period ($t_A$) to obtain a predefined, lower brightness (B).

6. The lighting device according to claim 1, wherein the plurality of light sources is controlled such that a brightness (B) of the light source unit during the anti-condensation period ($t_A$) decreases linearly or in increments.

7. The lighting device according to claim 6, wherein the anti-condensation period ($t_A$) lasts at least three hours.

8. The lighting device according to claim 1, wherein the plurality of light sources is controlled such that the decrease in a brightness (B) follows a parabolic curve during the anti-condensation period ($t_A$).

9. A method for controlling the lighting device for vehicles according to claim 1, the method comprising:

successively switching off and/or dimming the first set of light sources of the plurality of light sources in the light source unit, such that a brightness (B) of the light source unit decreases continuously during the anti-condensation period ($t_A$), until the brightness (B) reaches a full blackout at an end ($t_2$) of the anti-condensation period (t), wherein the first set of light sources is controlled at a start ($t_1$) of the anti-condensation period ($t_A$) to generate the low beam light distribution while the second set of light sources is switched off at the start ($t_1$) of the anti-condensation period ($t_A$).

10. The method according to claim 9, wherein when the brightness (B) of the light source unit during the anti-condensation period ($t_A$) is reduced, a decrease in temperature on the inner surface of the lens and/or inside the housing is small enough that a temperature on the inner surface of the lens and/or a temperature ($T_{IN}$) inside the housing remains higher than a dew point temperature ($T_{TAU}$).

11. The method according to claim 9, wherein the brightness (B) of the light source unit decreases linearly during an anti-condensation period ($t_A$) of at least two hours.

12. The method according to claim 10, wherein the decrease in the brightness (B) of the light source unit follows a parabolic curve during an anti-condensation period ($t_A$) of at least 1 hour.

* * * * *